United States Patent
Saxback et al.

(10) Patent No.: US 6,283,141 B1
(45) Date of Patent: Sep. 4, 2001

(54) DOSAGE DEVICE

(75) Inventors: Lars Saxback, Nacka; Sune Kauppi, Johanneshov, both of (SE)

(73) Assignee: Atlas Copco Berema AB, Nacka (SE)

( * ) Notice: Subject to any disclaimer, the term of this patent is extended or adjusted under 35 U.S.C. 154(b) by 0 days.

(21) Appl. No.: 09/214,417

(22) PCT Filed: Apr. 17, 1997

(86) PCT No.: PCT/SE97/00652

§ 371 Date: Jan. 5, 1999

§ 102(e) Date: Jan. 5, 1999

(87) PCT Pub. No.: WO98/01262

PCT Pub. Date: Jan. 15, 1998

(30) Foreign Application Priority Data

Jul. 5, 1996 (SE) .................................................. 9602674

(51) Int. Cl.[7] .................. F04F 1/06; F04F 1/18; F16N 7/30; F16K 5/22
(52) U.S. Cl. .......... 137/209; 137/237; 137/550; 173/DIG. 3; 184/7.4; 184/55.2
(58) Field of Search .................... 137/237, 246, 137/246.23, 550, 209, 212; 184/6.14, 7.4, 55.1, 55.2, 76, 57; 173/DIG. 3

(56) References Cited

U.S. PATENT DOCUMENTS

| 3,581,845 | 6/1971 | Van Nederynen | 173/DIG. 3 |
| 3,977,496 | * 8/1976 | Black | 137/246.23 |
| 5,249,645 | 10/1993 | Wiklund | 184/55.1 |

FOREIGN PATENT DOCUMENTS

| 2804665 | 8/1978 | (DE) | 173/DIG. 3 |
| 467 320 | 6/1992 | (SE) . | |

* cited by examiner

Primary Examiner—George L. Walton
(74) Attorney, Agent, or Firm—Jacobson Holman, PLLC

(57) ABSTRACT

A liquid metering device for a compressed air tool including a sealable liquid tank whose lower part is connected to the compressed air inlet on the tool downstream from a throttle valve, via a through-flow impeding filter element that is in contact with the liquid in the tank. The filter element communicates directly with an upper tank space disposed in the tank above the intended maximum liquid level of the tank.

10 Claims, 2 Drawing Sheets

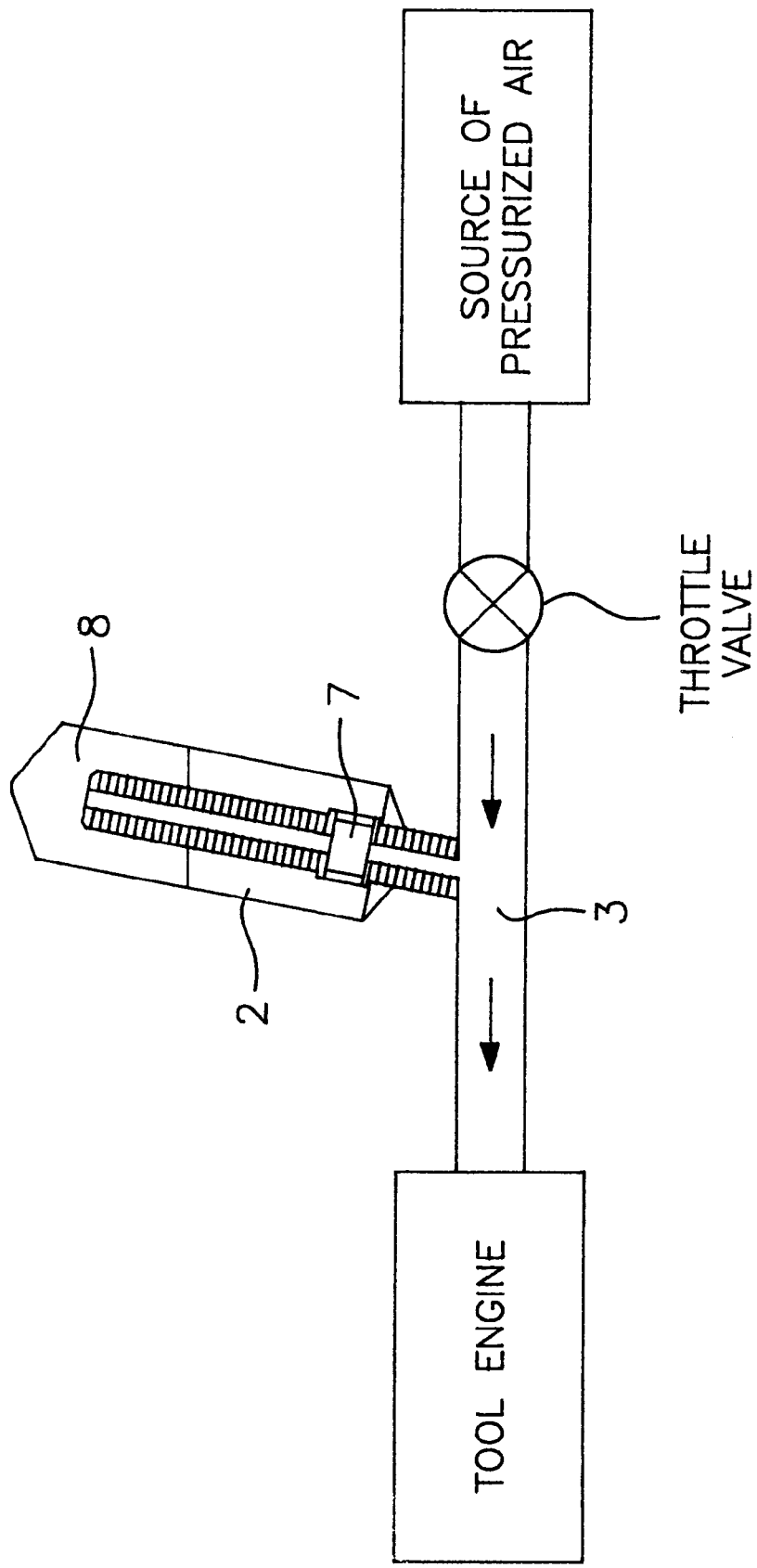

DOSAGE DEVICE

BACKGROUND OF THE INVENTION

1. Field of the Invention

The present invention relates to a liquid dosing or metering device for compressed air tools, wherein the device includes a sealable liquid tank whose lower part is connected to the compressed air inlet on the tool, downstream of its throttle valve, via a flow-restricting or flow-impeding filter element that is in contact with the liquid.

2. Description of the Related Art

Such metering devices are intended to supply a usually very small amount of liquid, normally a suitable oil, to the compressed air inlet downstream of the throttle valve in the event of an interruption in the operation of a compressed air tool. When operation is resumed, this liquid is entrained by the compressed air into the tool. It is difficult to avoid undesirable leakage of the liquid from the tank to the air inlet if there is a long interruption in operation. Moreover, it is difficult to provide, regardless of the liquid level, the desired uniform liquid dosage to the air inlet with every interruption in operation.

SUMMARY OF THE INVENTION

The object of the invention is to provide a novel and advantageous liquid metering device with which the aforesaid difficulties are avoided at least to a substantial extent.

To this end, it is proposed in accordance with the invention that the filter element of a device of the kind defined in the introduction also communicates directly with an upper tank space in the tank above the intended maximum liquid level in said tank. This arrangement is advantageous in that for each interruption in operation the metering device will only dispense the liquid that is already in the filter element, whereafter the pressure in the liquid tank continues to be relieved, i.e. lowered, by forcing essentially only air from the upper tank space to the compressed air inlet via the filter element.

Additional advantageous features of the invention are set forth in the dependent claims.

BRIEF DESCRIPTION OF THE DRAWINGS

Hereinafter, the invention will be described in greater detail with reference to an exemplifying embodiment of the invention and also with reference to the accompanying drawing

FIG. 3 is a block diagram of the relationship between the liquid metering device and components of the air tool, in accordance with the present invention.

DETAILED DESCRIPTION OF THE PREFERRED EMBODIMENTS

Figure 1:
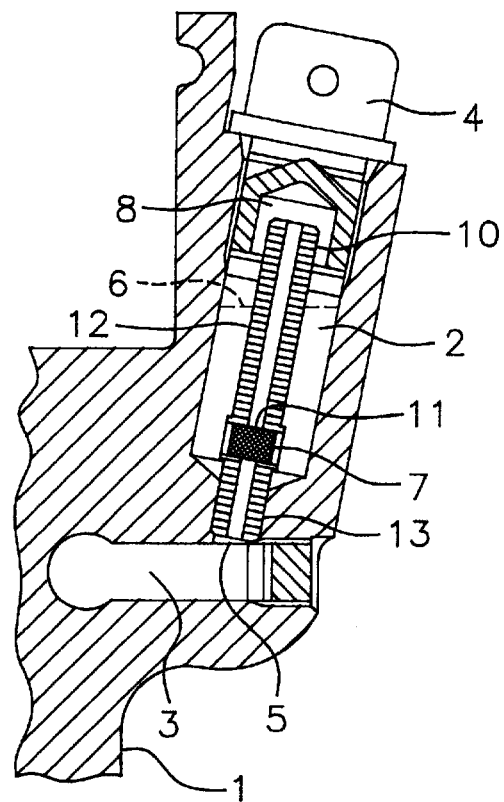
FIG. 1 is a partial cross-sectional view of a compressed air tool that has been provided with a liquid metering or dosing device in accordance with the invention.

FIG. 1 shows a part of a compressed air tool generally designated 1. In the illustrated case, the tool is presumed to be a conventional compressed air breaker or chisel, although it could be any chosen impact or rotary compressed air tool a small oil accommodating tank 2 has been built into the tool casing. Each time operation of the tool is interrupted, a small amount of oil will be metered out to the compressed air inlet 3 of the tool at a region thereof which is located downstream from the throttle valve (see FIG. 3) of the tool, i.e. in an area or region that is under pressure while the tool is operating but that is relieved of pressure when the tool is stopped as a result of the closing of the throttle valve. Tank 2 is sealed tightly by means of a closure hood 4, and is provided with a bottom opening 5 that passes between the bottom of the tank and air inlet 3. The broken line 6 indicates the oil level in the tank 2.

Shown at 7 is a filter element which is in contact with the oil in the tank 2 and via which the tank communicates with the air inlet 3. The filter element 7 is made from an open-pore material, for instance a sintered material, such as sintered bronze, with pores in the range of 2–10 μm, for instance in the range of 4–7 μm. The filter element 7 thus impedes the through-flow of oil so that leakage of oil out to the inlet will be prevented when the pressures prevailing in the tank 2 and the inlet 3 are the same, but will allow air to enter the tank 2 when a positive relative pressure prevails in the inlet 3, and will allow oil and air to flow out to the inlet 3 when a relative positive pressure prevails in the tank 2. However, filter element 7, which offers less resistance to the through-flow of air than to the through-flow of oil, also communicates directly with the upper space 8 in the tank above the level 6 and above the intended maximum oil level so that when there is a positive relative pressure in tank 2, predominantly air is forced through the filter element 7 as soon as the air has forced the oil present in element 7 out to the inlet 3. This ensures, as desired, that only small amounts of oil, 0.08–0.18 ml for example, will be pressed out into the inlet each time the operation of tool 1 is interrupted, and that the pressure between the tank 2 and the inlet 3 will be quickly equalised, e.g. within the space of 1–5 seconds, after such an interruption. Conversely, there will be a quick build-up of pressure in tank 2 after the throttle valve is opened, since the air is able to flow into the tank with relative ease after the oil present in the filter element has been forced out.

Figure 2:
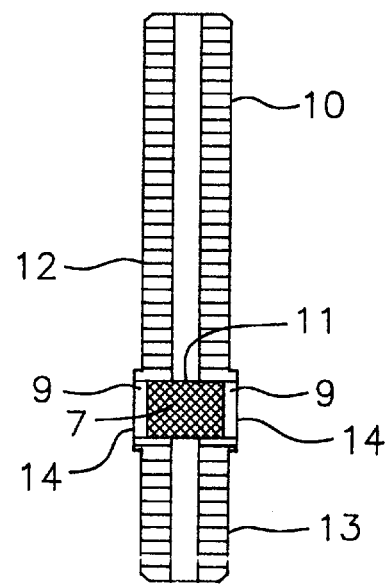
FIG. 2 is an axial sectional view drawn to a larger scale through a pipe having a built-in filter element utilized in accordance with the invention.

In the illustrated example, the filter element 7 has two side surfaces 9 (FIG. 2) that are exposed to the liquid in tank 2, while a piping 10 runs between the upper tank space 8 and an upper surface 11 of the filter element 7. As a result of capillary action, the filter element 7 sucks up oil through both of the surfaces 9, and is emptied into the tank by means of in-flowing air when there is a positive relative pressure in the inlet 3, and which is emptied into inlet 3 by means of out-flowing air when there is a positive relative pressure in the chamber 2. Most advantageously, as shown most clearly in FIG. 2, the filter element 7 is mounted in a relatively thick-walled pipe 12, wherein that part of the pipe which is located above the element 7 forms the aforesaid piping 10 and that part 13 which is located beneath the element 7 is fitted, e.g. force fitted, into the opening 5. Pipe 12 has a diagonal through-bore 14 with an inside diameter that is larger than the inside diameter of the pipe 12, wherewith filter element 7 is received in the bore 14 with a press fit for example.

The invention is not limited to the described and illustrated embodiment, but can be implemented in any desired manner within the scope of the inventive concept as defined in the accompanying claims.

What is claimed is:

1. A liquid metering device for a pneumatic power tool having an air inlet passage and a throttle valve, comprising a closed liquid reservoir with a lower space containing liquid and an upper space containing an air volume, conduit means for communicating pressurized air in alternative flow directions between said inlet passage and said upper space, and a porous filter element within said conduit means and having at least one surface continuously exposed to the liquid in said lower space and an air exposed part in fluid communication with said upper space and said air inlet passage such that liquid absorbed by the at least one surface of the filter is forced into said reservoir by means of in-flowing air when there is a positive relative pressure in the air inlet passage upon start-up of the tool, and liquid absorbed by the filter is pressed out into said air inlet passage by means of out-flowing air when there is a positive relative pressure in the upper space due to shut-down of the tool, a pressure differential being induced at opening and closing of said throttle valve, said filter preventing oil flow in an absence of said pressure differential.

2. The metering device according to claim 1, wherein said means for communicating is embodied as a pipe and said filter element is inserted in a transverse bore in said pipe between said upper space and said air inlet passage, said at least one surface comprising two opposite end surfaces of said filter element exposed to the liquid at the ends of said bore.

3. The metering device according to claim 1, wherein said filter element is located between said upper space and said air inlet passage and impedes the air flow between the upper space and said air inlet passage, said filter preventing oil flow to the inlet passage in an absence of pressure differential.

4. The metering device according to claim 2, wherein said pipe has a smaller diameter than said transverse bore such that said air exposed part is smaller than said two end surfaces.

5. A liquid metering device for a pneumatic power tool having an air inlet passage and a throttle valve, comprising a closed liquid reservoir with a lower space containing liquid and an upper space containing an air volume, an opening located in said lower space and communicating with said air inlet passage downstream of said throttle valve, a pipe extending between said opening and said upper space for communicating pressurized air in alternative flow directions between said inlet passage and said upper space, and a porous filter element located in said pipe and arranged to be penetrated by said air flow, said filter element having at least one surface continuously exposed to the liquid in said lower space and an air exposed part penetrated by said air flow, said filter element forming a flow restriction to the air flow through said pipe such that liquid absorbed from the reservoir by the at least one surface of the filter is emptied back into said reservoir by means of in-flowing air upon tool start-up when there is a positive relative pressure in the air inlet passage, and liquid absorbed from the reservoir by the at least one surface of the filter is pressed out into said air inlet passage by means of out-flowing air from the upper space when there is a positive relative pressure in the upper space upon tool shut-down, changes in pressure and resulting change in airflow direction being induced in said pipe at shifting of said throttle valve upon tool start-up and shut-down, said liquid pressed out into said air inlet passage responsive to tool shut-down providing lubrication to the tool upon a next tool start-up sequence.

6. The metering device according to claim 5, wherein said pipe comprises a tube element extending through said lower space from said opening to said upper space, and said filter element is inserted in a transverse bore in said pipe, said at least one surface comprises two opposite end surfaces of said filter element exposed to the liquid at the ends of said bore.

7. The metering device according to claim 6, wherein said pipe has a smaller diameter than said transverse bore such that said air exposed part is smaller than said two end surfaces.

8. The metering device according to claim 5, wherein said filter element comprises a sintered material.

9. The metering device according to claim 8, wherein said sintered material is sintered bronze with pores in a range of 2–10 $\mu$m.

10. A liquid metering device for lubricating an air tool having an air inlet passage, said device comprising a reservoir, a conduit extending within said reservoir and a filter, said reservoir having an upper space containing air and a lower space containing oil, said filter arranged in a through-bore within said conduit and in communication with said air inlet passage, said upper space and said lower space, said filter absorbing oil from the reservoir through at least one surface of the filter in response to a positive relative pressure in said upper space creating at tool shut-down when pressure in the air inlet passage is dissipated through the tool, oil absorbed from the reservoir by the at least one surface of the filter being pressed out into said air inlet passage by means of out-flowing air from the upper space in response to said positive relative pressure in the upper space, and said filter preventing oil flow to said air inlet passage once a pressure differential between said upper space and said air inlet passage has been equalized.

* * * * *